US008566827B2

(12) United States Patent
Mewhinney et al.

(10) Patent No.: US 8,566,827 B2
(45) Date of Patent: Oct. 22, 2013

(54) SYSTEM AND METHOD OF ARBITRATING ACCESS OF THREADS TO SHARED RESOURCES WITHIN A DATA PROCESSING SYSTEM

(75) Inventors: Greg R. Mewhinney, Austin, TX (US); Mysore S. Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2240 days.

(21) Appl. No.: 11/260,611

(22) Filed: Oct. 27, 2005

(65) Prior Publication Data

US 2007/0101333 A1    May 3, 2007

(51) Int. Cl.
*G06F 9/46* (2006.01)

(52) U.S. Cl.
USPC ......................................................... 718/100

(58) Field of Classification Search
USPC ......................................................... 718/102
See application file for complete search history.

(56) References Cited

U.S. PATENT DOCUMENTS

| 6,167,424 | A  | * | 12/2000 | Bak et al. ...................... 718/100 |
| 6,714,958 | B1 | * | 3/2004  | Tudor ............................ 718/100 |
| 6,735,769 | B1 |   | 5/2004  | Brenner et al. |
| 6,845,504 | B2 |   | 1/2005  | Hua et al. |
| 6,910,212 | B2 |   | 6/2005  | Brenner et al. |

| 2002/0029239 | A1 | * | 3/2002  | Sullivan et al. ............... 709/104 |
| 2002/0184290 | A1 |   | 12/2002 | Olszewski et al. |
| 2003/0233392 | A1 | * | 12/2003 | Forin et al. .................... 709/107 |

OTHER PUBLICATIONS

Optimized List Insertion for Lock Waiters, IBM Research Disclosure, Apr. 1999, p. 529.
Enhancements for multithreaded processors: Improved backward compatibility and improved idle code detection, IBM Research Disclosure, Jan. 2002, p. 147.

* cited by examiner

*Primary Examiner* — Gregory A Kessler
(74) *Attorney, Agent, or Firm* — Yudell Isidore Ng Russell PLLC

(57) ABSTRACT

A first collection of threads which represent a collection of tasks to be executed by at least one of a collection of processing units is monitored. In response to detecting a request by a thread among the first collection of threads to access a shared resource locked by a second thread among the collection of threads, the first thread attempts to access a list associated with the shared resource. The list orders at least one thread among the collection of threads by priority of access to the shared resource. In response to determining the list is locked by a third thread among the collection of threads, the first thread is placed into a sleep state to be reawakened in a fixed period of time. In response to determining that at least one of the collection of processing units has entered into an idle state, the first thread is awakened from the sleep state before the fixed period of time has expired. Also, in response to awakening the first thread from the sleep state, the first thread is assigned to at least one of the collection of processing units and the first thread retries its attempt to access the list.

9 Claims, 4 Drawing Sheets

SYSTEM AND METHOD OF ARBITRATING ACCESS OF THREADS TO SHARED RESOURCES WITHIN A DATA PROCESSING SYSTEM

BACKGROUND OF THE INVENTION

1. Technical Field

The present invention relates in general to the field of data processing systems. Particularly, the present invention relates to the field of sharing resources within data processing systems.

2. Description of the Related Art

One of the greatest challenges of today's data processing systems is the efficient synchronization and arbitration of shared resources. Modern data processing systems typically include multiple processing units that frequently share resources, such as system memory and cache memory.

Generally, programs that take advantage of multi-processor architectures are referred to as "parallel programs". A "task" is an arbitrarily defined piece of work performed by the parallel program. A "process" (herein utilized interchangeably with "thread") is an abstract entity that performs tasks. A parallel program includes multiple cooperating processes that perform tasks in the program. Tasks are assigned to processes or threads by some assignment mechanism implemented in software, hardware, or a combination thereof. The method in which processes perform their assigned tasks is through execution via physical processing units. Processes may need to synchronize with each other to perform their assigned tasks and share resources within the data processing system, such as memory.

The problem with sharing resources is that often, a first thread may require data stored in a memory location that is locked by a second thread within the system. As well-known in the prior art in such a situation, the first thread will continually try to access the locked memory location until successful. However, continually retrying accesses to an inaccessible memory location wastes processing unit resources that could be put to better use through the performance of useful work. Therefore, there is a need to improve the handling of conditions within modern data processing systems during which processing units are not able to proceed with useful work due to the temporary unavailability of a shared resource.

SUMMARY OF THE INVENTION

The present invention includes a system and method of arbitrating access to shared resources within a data processing system. A first collection of threads which represent a collection of tasks to be executed by at least one of a collection of processing units is monitored. In response to detecting a request by a thread among the first collection of threads to access a shared resource locked by a second thread among the collection of threads, the first thread attempts to access a list associated with the shared resource. The list orders at least one thread among the collection of threads by priority of access to the shared resource. In response to determining the list is locked by a third thread among the collection of threads, the first thread is placed into a sleep state to be reawakened in a fixed period of time. In response to determining that at least one of the collection of processing units has entered into an idle state, the first thread is awakened from the sleep state before the fixed period of time has expired. Also, in response to awakening the first thread from the sleep state, the first thread is assigned to at least one of the collection of processing units and the first thread retries its attempt to access the list.

The above-mentioned features, as well as additional objectives, features, and advantages of the present invention will become apparent in the following detailed description.

BRIEF DESCRIPTION OF THE FIGURES

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

Figure 1:
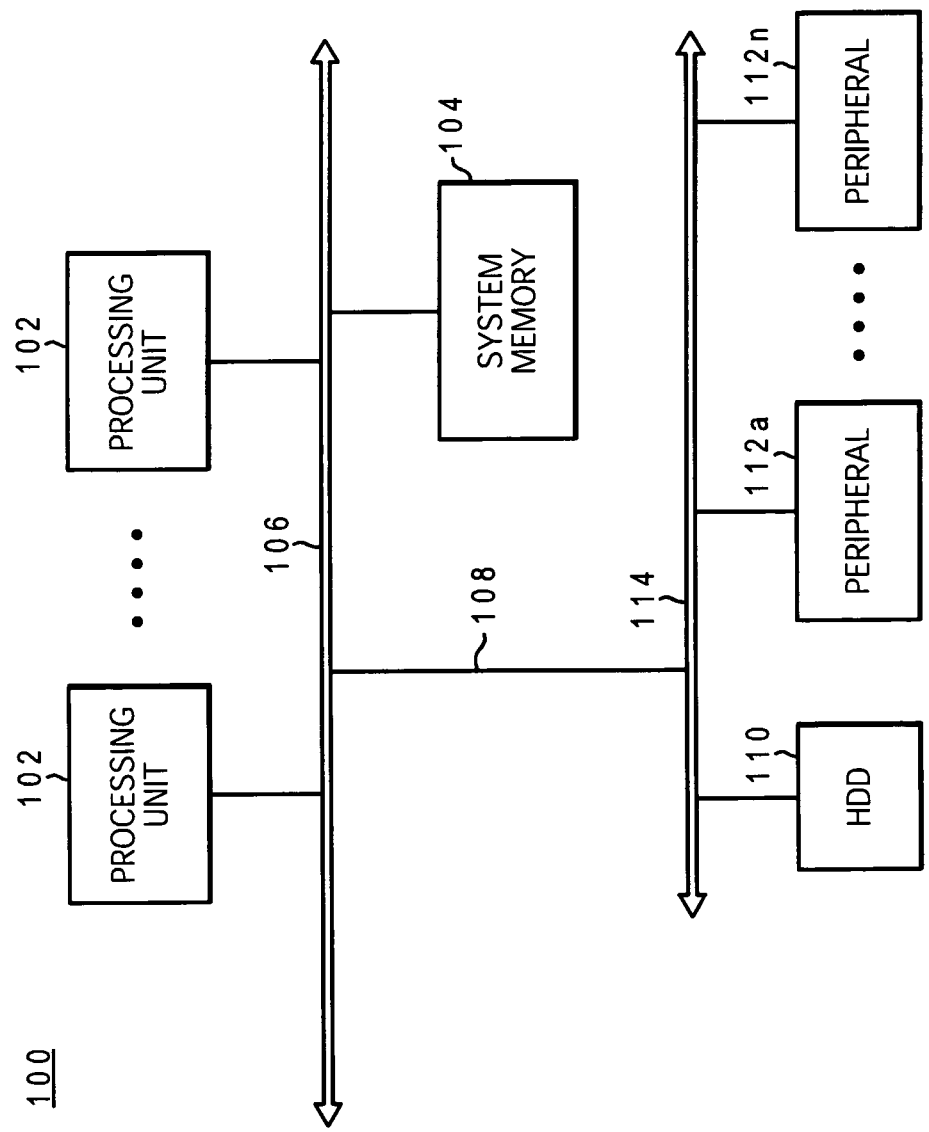
FIG. 1 is a block diagram illustrating an exemplary data processing system in which a preferred embodiment of the present invention may be implemented.

As depicted, exemplary data processing system 100 includes processing unit(s) 102, which are coupled to system memory 104 via system bus 106. Preferably, system memory 104 may be implemented as a collection of dynamic random access memory (DRAM) modules. Typically, system memory 104 includes data and instructions for running a collection of applications. Mezzanine bus 108 acts as an intermediary between system bus 106 and peripheral bus 114. Those with skill in this art will appreciate that peripheral bus 114 may be implemented as a peripheral component interconnect (PCI), accelerated graphics port (AGP), or any other peripheral bus. Coupled to peripheral bus 114 is hard disk drive 110, which is utilized by data processing system 100 as a mass storage device. Also coupled to peripheral bus 114 are a collection of peripherals 112*a-n*.

Those skilled in the art will appreciate that data processing system 100 can include many additional components not specifically illustrated in FIG. 1. Because such additional components are not necessary for an understanding of the present invention, they are not illustrated in FIG. 1 or discussed further herein. It should also be understood, however, that the enhancements to data processing system 100 to improve handling of shared resources provided by the present invention are applicable to data processing systems of any system architecture and are in no way limited to the generalized multi-processor architecture or symmetric multi-processing (SMP) architecture illustrated in FIG. 1.

Figure 2:
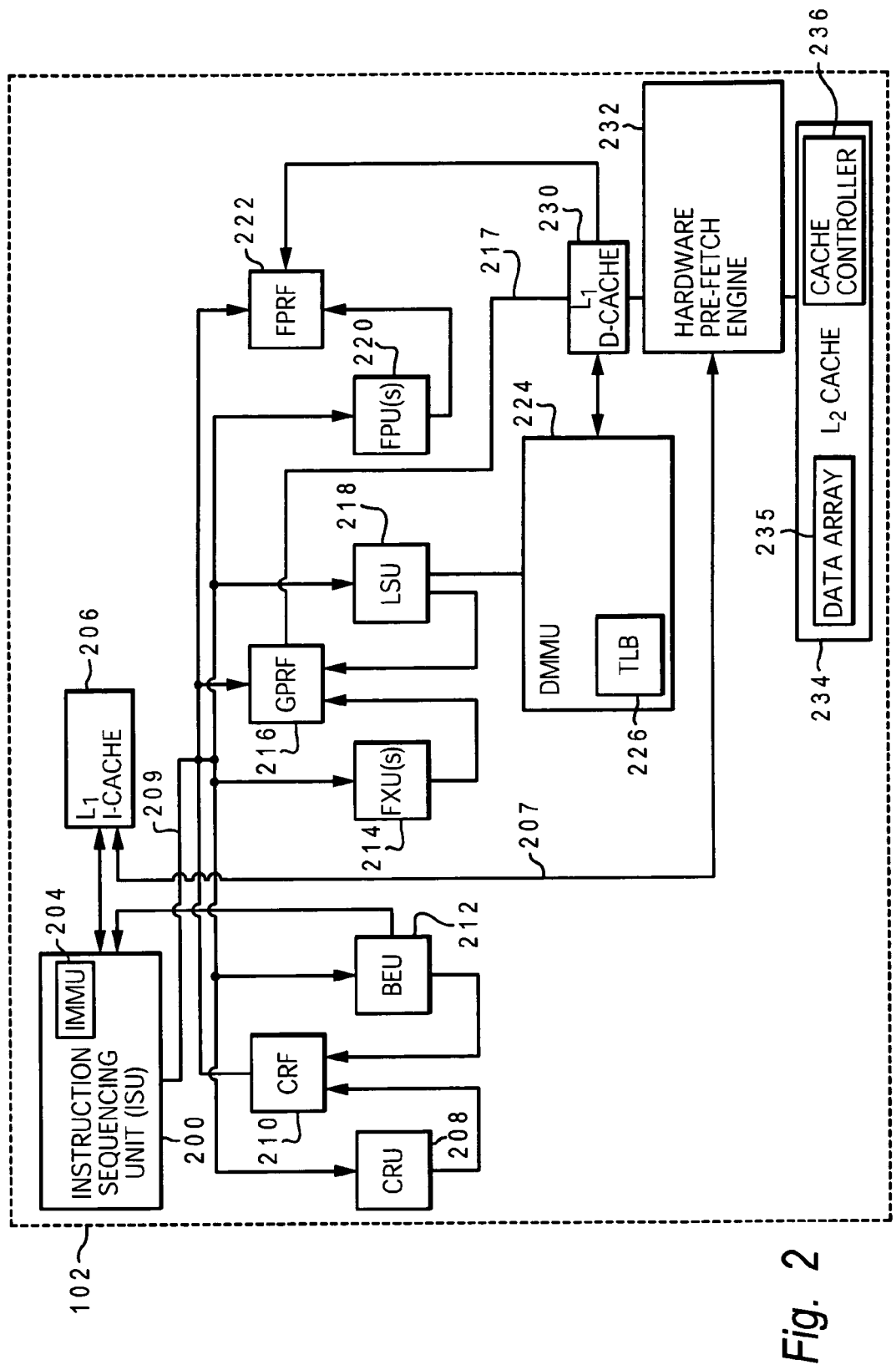
FIG. 2 is a block diagram depicting an exemplary processing unit in which a preferred embodiment of the present invention may be implemented.

With reference now to FIG. 2, there is illustrated a detailed block diagram of an exemplary embodiment of a processing unit 102 in accordance with the present invention. As shown, processing unit 102 contains an instruction pipeline including an instruction sequencing unit (ISU) 200 and a number of execution units 208, 212, 214, 218, and 220. ISU 200 fetches instructions for processing from an L1 I-cache 206 utilizing real addresses obtained by the effective-to-real address translation (ERAT) performed by instruction memory management unit (IMMU) 204. Of course, if the requested cache line of instructions does not reside in L1 I-cache 206, then ISU 200 requests the relevant cache line of instructions from L2 cache 234 via I-cache reload bus 207, which is also coupled to hardware pre-fetch engine 232. L2 cache 234 also includes a data array 235 and a cache controller 236.

After instructions are fetched and preprocessing, if any, is performed, ISU 200 dispatches instructions, possibly out-of-order, to execution units 208, 212, 214, 218, and 220 via instruction bus 209 based upon instruction type. That is, condition-register-modifying instructions and branch instructions are dispatched to condition register unit (CRU) 208 and branch execution unit (BEU) 212, respectively, fixed-point and load/store instructions are dispatched to fixed-point unit(s) (FXUs) 214 and load-store unit(s) (LSUs) 218, respectively, and floating-point instructions are dispatched to floating-point unit(s) (FPUs) 220.

The instruction set utilized by ISU 200 includes, but is not limited to, instructions for arbitrating and controlling synchronization locks for shared resources according to a preferred embodiment of the present invention. The instruction set may be sorted in any computer-readable medium with data processing system 100. These computer-readable media include, but are not limited to, system memory 104, caches 206 and 234, HDD 110, and may be implemented in any type of read-only, random-access, optical, or magnetic medium.

After possible queuing and buffering, the instructions dispatched by ISU 200 are executed opportunistically by execution units 208, 212, 214, 218, and 220. Instruction "execution" is defined herein as the process by which logic circuits of a processing unit examine an instruction operation code (opcode) and associated operands, if any, and in response, move data or instructions in the data processing system (e.g., between system memory locations, between registers or buffers and memory, etc.) or perform logical or mathematical operations on the data. For memory access (i.e., load-type or store-type) instructions, execution typically includes calculation of a target effective address (EA) from instruction operands.

During execution within one of execution units 208, 212, 214, 218, and 220, an instruction may receive input operands, if any, from one or more architected and/or rename registers within a register file coupled to the execution unit. Data results of instruction execution (i.e., destination operands), if any, are similarly written to instruction-specified locations within the register files by execution units 208, 212, 214, 218, and 220.

For example, FXU 214 receives input operands from and stores destination operands (i.e., data results) to a general-purpose register file (GPRF) 216, FPU 220 receives input operands from and stores destination operands to a floating-point register file (FPRF) 222, and LSU 218 receives input operands from GPRF 216 and causes data to be transferred between L1 D-cache 230 (via interconnect 217) and both GPRF 216 and FPRF 222. Similarly, when executing condition-register-modifying or condition-register-dependent instructions, CRU 208 and BEU 212 access control register file (CRF) 210, which in a preferred embodiment includes a condition register, link register, count register, and rename registers of each. BEU 212 accesses the values of the condition, link and count registers to resolve conditional branches to obtain a path address, which BEU 212 supplies to instruction sequencing unit 200 to initiate instruction fetching along the indicated path. After an execution unit finishes execution of an instruction, the execution unit notifies instruction sequencing unit 200, which schedules completion of instructions in program order and the commitment of data results, if any, to the architected state of processing unit 202.

Still referring to FIG. 2, a preferred embodiment of the present invention preferably includes a data memory management unit (DMMU) 224. DMMU 224 translates effective addresses (EA) in program-initiated load and store operations received from LSU 218 into physical addresses (PA) utilized to access the volatile memory hierarchy comprising L1 D-cache 230, L2 cache 234, and system memories 104. DMMU 224 includes a translation lookaside buffer (TLB) 226 and a TLB pre-fetch engine 228.

TLB 226 buffers copies of a subset of the Page Table Entries (PTEs), which are utilized to translate effective addresses (EAs) employed by software executing within processing units 102 into physical addresses (PAs). As utilized herein, an effective address (EA) is defined as an address that identifies a memory storage location or other resource mapped to a virtual address space. A physical address (PA), on the other hand, is defined herein as an address within a physical address space that identifies a real memory storage location or other real resource.

Figure 3:
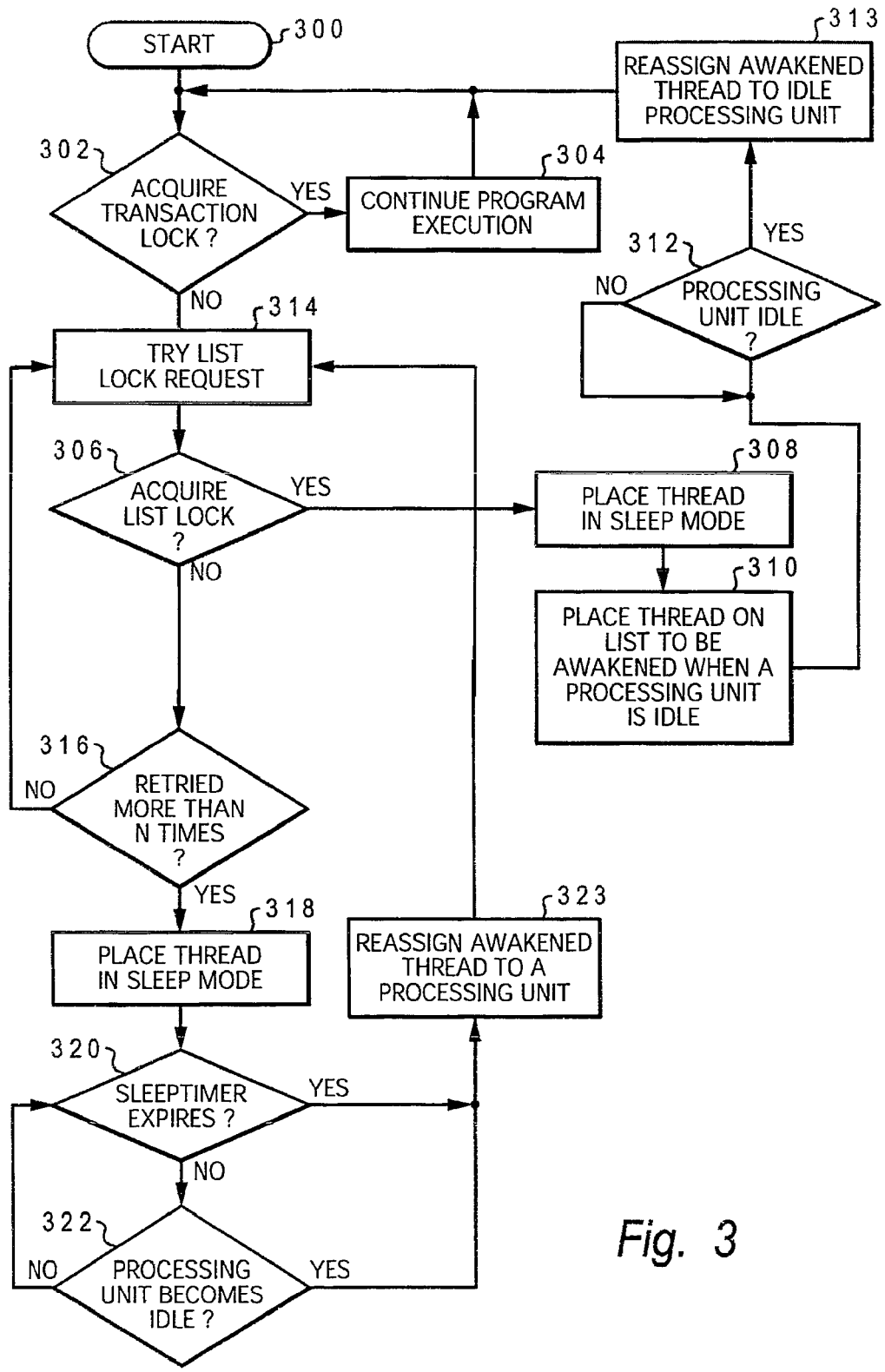
FIG. 3 is a high-level logical flowchart illustrating an exemplary method of handling the access of a shared resource by multiple threads according to a preferred embodiment of the present invention.

FIG. 3 is a high-level logical flowchart depicting an exemplary method of arbitrating shared resources within a data processing system according to a preferred embodiment of the present invention. Those with skill in the art will appreciate that the present method of arbitrating shared resources may be implemented by any method including, but not limited to, software (e.g., software synchronization algorithms), hardware (e.g., shared lock lines with a priority circuit that arbitrates which processing unit obtains the next lock line when there are multiple requesters), and any combination of software and hardware.

As previously discussed, a "process" or "thread" is an entity that performs task within the context of a program. The method in which processes perform their assigned tasks is through execution via physical processing units, such as processing units 102. To prevent data corruption, any memory location that can be written to (altered) by more than one thread, such as locations within system memory 104, caches 206 and 236, etc. must be locked by a first thread during access. If a second thread requests access to the same memory location accessed by the first thread, the second thread must wait until the first thread has completed its operation.

Figure 4A:
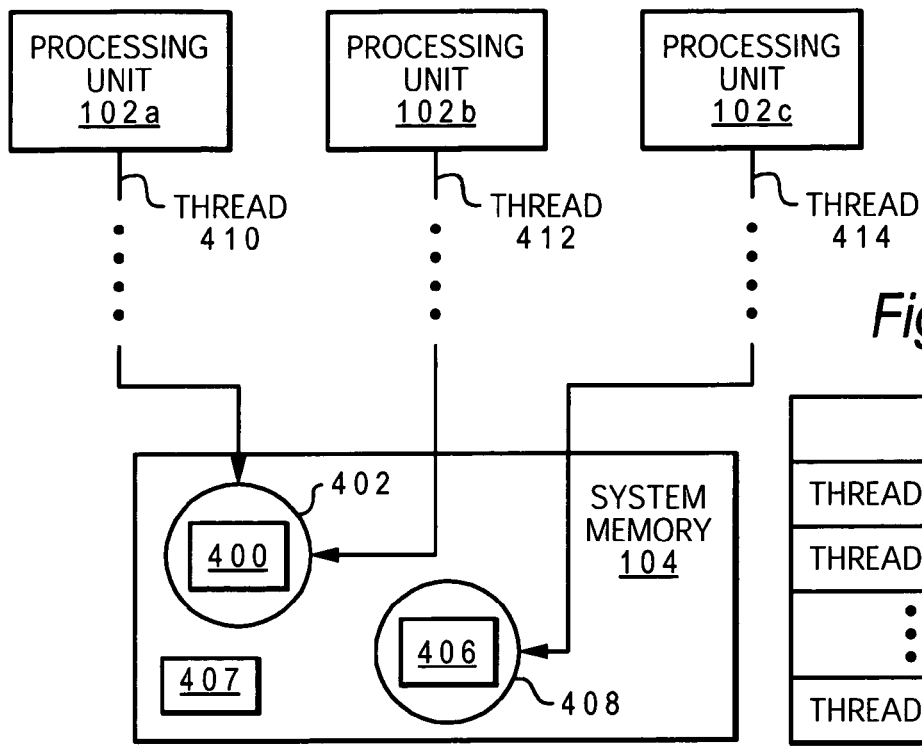
FIG. 4A is a simplified block diagram of exemplary data processing system 100 of FIG. 1 which depicts a pair of threads competing for a transaction lock in accordance with a preferred embodiment of the present invention.
Figure 4B:
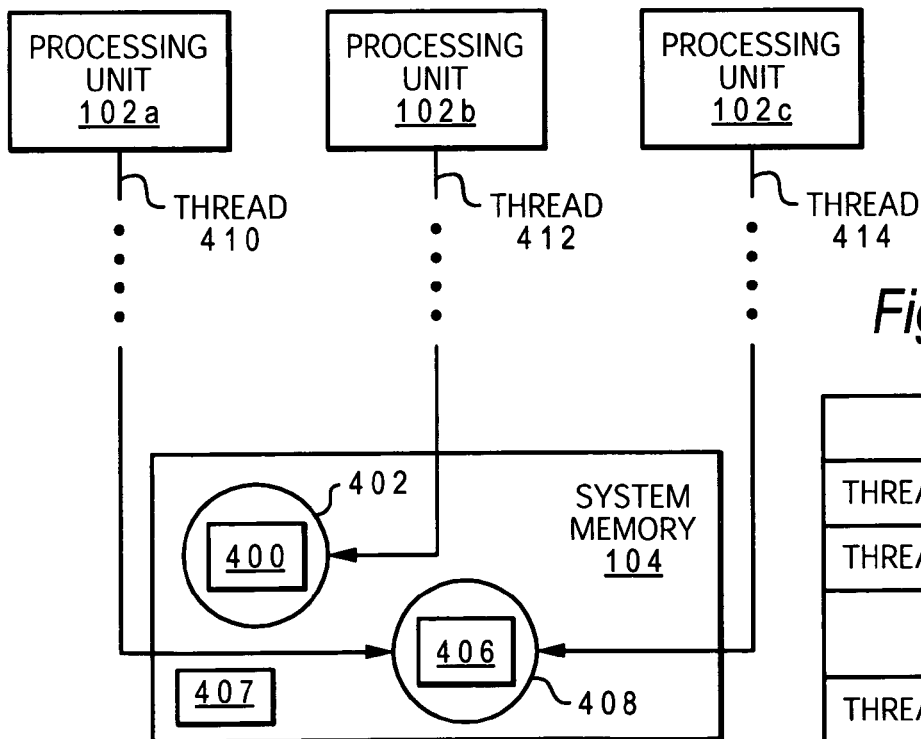
FIG. 4B is a simplified block diagram of exemplary data processing system 100 of FIG. 1 which illustrates a pair of threads competing for a list lock in accordance with a preferred embodiment of the present invention.

FIGS. 4A and 4B are a simplified block diagram of an exemplary data processing system 100 depicting how a preferred embodiment of the present invention arbitrates shared resources. As illustrated, a collection of threads 410, 412, and 414 are executed from processing units 102a, 102b, and 102c, respectively. Also depicted are system memory location 400, transaction lock 402, list 406, sleep timer 407 list lock 408, and threads 416, 418, and 414, all of which are waiting for access to system memory location 400. In order to conserve processing time on processing units 102, it is desirable for processing units 102 to process lock acquisition retry requests from threads only when the processing units do not have otherwise useful work to perform (e.g., the processing units have entered into an idle state). Since threads, such as threads 410, 412, and 414, are virtual entities utilized to process a given task, any processing unit 102 in data processing system 100 may execute the threads.

A preferred embodiment of the present invention provides a system and method of executing threads that are issuing retry requests to list lock 408 on processing units 102 that do not have otherwise useful work to perform. If a thread has exceeded a predetermined number of list lock retry requests, it is assumed that the list lock will not be available in the near future and the thread is placed into a sleep mode. A thread is revived from the sleep mode when: (1) sleep timer 407 expires after a predetermined period of time and the thread is reassigned to a processing unit 102 for execution; or (2) a processing unit 102 has entered into an idle state and is not performing useful work.

As illustrated in FIG. 4A, thread 410 requires access to system memory location 400, so thread 410 requests the acquisition of transaction lock 402 for system memory location 400 (steps 300 and 302 of FIG. 3). As depicted, thread 412 has acquired transaction lock 402 of system memory location 400, which locks out thread 410. If thread 410 had been able to acquire access to transaction lock 402 to system memory location 400 (e.g., if thread 412 did not have access to transaction lock 402), thread 410 would merely continue processing its assigned task (step 304).

Referring now to FIG. 4B, since thread 410 cannot acquire a transaction lock 402 on system memory location 400, thread 410 requests access to list lock 408 (step 314). In a preferred embodiment of the present invention, list 406 includes a list of threads that are waiting for access to system memory location 400. In order for a thread to be added to list 406, it must acquire a list lock 408 to prevent other threads from accessing list 406. Often, if multiple threads seek access to the same memory location, there is a competition for access to list lock 408 in order to be added to list 406. Also, in a preferred embodiment of the present invention, list lock 408 is a global enabled lock in user space (e.g., accessible by user applications and not privileged by the kernel or lower levels of the operating system). Also, when a thread is placed in a sleep mode, the thread is awakened when a processing unit 102 has entered into an idle state, or can be considered to have a priority just about idle and placed on a local run queue of a processing unit 102.

As illustrated in FIG. 4B, list lock 408 is currently being held by thread 414, issued from processing unit 102c. Thread 410 will retry the list lock request (step 314). If the list lock request has failed (as represented by a negative determination at block 306) and has been retried more than a predetermined number of times (step 316), processing unit 102a will place thread 410 in a sleep mode (step 318) and start sleep timer 407 for thread 410. Those with skill in the art will appreciate that although sleep timer 407 is illustrated in FIGS. 4A and 4B as locations in system memory 104, sleep timer 407 may also be implemented in other ways including, but not limited to, via software stored in other computer-readable media, via a hardware circuit, or any combination of hardware and software. If the list lock request has not been retried more than a predetermined number of times (block 316), the process returns to step 314 and proceeds in an iterative fashion.

If the sleep timer expires (step 320), the process returns to step 314, which illustrates thread 410 retrying the list lock request after being reassigned to a processing unit 102 (step 323). However, if the sleep timer has not expired, the process continues to step 322, which depicts a determination made as to whether a processing unit 102 has become idle, which is defined as a processing unit 102 that is not performing useful work. If a processing unit 102 has not become idle, the process returns to step 320. However, if a processing unit 102 has become idle, thread 410 is assigned to the idle processing unit 102, the process returns to step 314, and proceeds in an iterative fashion.

Returning to step 306, if thread 410 acquires a list lock 408 on list 406, the process continues to step 308, which illustrates thread 410 being placed in a sleep mode. The process proceeds to step 310, which depicts thread 410 being placed on list 406, which includes entries of threads 416, 418, and 414 that are waiting for access to system memory location 400. The process continues to step 312, which illustrates a determination made as to whether a processing unit 102 has become idle. If a processing unit 102 has not become idle, the process iterates at step 312. If a processing unit 102 has become idle, thread 410 is assigned to the idle processing unit 102 (step 313) and the process returns to step 302, which illustrates thread 410 sending a request to acquire a transaction lock 402 on system memory location 400.

As disclosed, the present invention includes a system and method of arbitrating access to shared resources within a data processing system. A first collection of threads which represent a collection of tasks to be executed by at least one of a collection of processing units is monitored. In response to detecting a request by a thread among the first collection of threads to access a shared resource locked by a second thread among the collection of threads, the first thread attempts to access a list associated with the shared resource. The list orders at least one thread among the collection of threads by priority of access to the shared resource. In response to determining the list is locked by a third thread among the collection of threads, the first thread is placed into a sleep state. In response to determining that at least one of the collection of processing units has entered into an idle state, the first thread is awakened from the sleep state. Also, in response to awakening the first thread from the sleep state, the first thread is assigned to at least one of the collection of processing units and the first thread retries its attempt to access the list.

Also, it should be understood that at least some aspects of the present invention may be alternatively implemented in a computer-readable medium that stores a program product. Programs defining functions on the present invention can be delivered to a data storage system or a computer system via a variety of signal-bearing media, which include, without limitation, non-writable storage media (e.g., CD-ROM), writable storage media (e.g., floppy diskette, hard disk drive, read/write CD-ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:
1. A method of data processing in a data processing system including a plurality of processing units and a shared resource, said method comprising:
the data processing system monitoring a plurality of threads representing a plurality of tasks to be executed by at least one of the plurality of processing units;

the data processing system implementing a transaction lock separate from the shared resource that synchronizes access by the plurality of threads to the shared resource, a list associated with the shared resource that orders at least one thread among the plurality of threads by priority of access to the shared resource, and a list lock that synchronizes access by the plurality of threads to the list;

in response to a first thread among said plurality of threads unsuccessfully attempting to acquire the transaction lock synchronizing access to the shared resource because the transaction lock is held by a second thread among said plurality of threads, the first thread attempting to acquire the list lock that synchronizes access to the list associated with said shared resource;

in response to said first thread failing to acquire the list lock because the list lock is held by a third thread among said plurality of threads, placing said first thread into a sleep state;

thereafter, performing a first awakening said first thread from said sleep state and the first thread retrying said attempt to acquire said list lock;

in response to the first thread acquiring the list lock, placing the first thread into the sleep state and enrolling the thread in the list in order of priority of access to the shared resource; and in response to one or more of the plurality of processing units entering an idle state, performing a second awakening the first thread from the list in accordance with the order of priority of access to the shared resource specified by the list and executing the first thread to acquire the transaction lock and to access the shared resource.

2. The method according to claim 1, further comprising:
in response to determining said list is locked by said third thread among said plurality of threads, retrying said attempt to access said list for a predetermined number of tries prior to placing the first thread into the sleep state.

3. The method according to claim 1, wherein performing said first awakening of said first thread further comprises:
awakening the first thread in response to a first to occur of: (1) determining at least one of said plurality of processing units has entered into an idle state, and (2) expiration of a predetermined period of time.

4. A data processing system, comprising:
a plurality of processing units executing a plurality of threads representing a plurality of tasks;
a shared resource, coupled to said plurality of processing units;
a transaction lock separate from the shared resource that synchronizes access by the plurality of threads to the shared resource;
a list, associated to said shared resource, that orders at least one thread among said plurality of threads by priority of access to said shared resource;
a list lock that synchronizes access by the plurality of threads to the list; and
a computer-readable medium embodying computer program code executable by said plurality of processing units and configured to cause the data processing system to perform:
in response to a first thread among said plurality of threads unsuccessfully attempting to acquire the transaction lock synchronizing to access a shared resource because the transaction lock is held by a second thread among said plurality of threads, the first thread attempting to access a list associated with said shared resource;

in response to said first thread failing to acquire the list lock because it is held by a third thread among said plurality of threads, place said first thread into a sleep state;

thereafter, awakening said first thread from said sleep state a first time and said first thread retrying said attempt to acquire said list lock;

in response to the first thread acquiring the list lock, placing the first thread into the sleep state and enrolling the thread in the list in order of priority of access to the shared resource; and in response to one or more of the plurality of processing units entering an idle state, awakening the first thread a second time in accordance with the order of priority of access to the shared resource specified by the list and executing the first thread to acquire the transaction lock and to access the shared resource.

5. The data processing system according to claim 4, wherein said computer program code further causes the data processing system to perform:
in response to determining said list is locked by said third thread among said plurality of threads, retrying said attempt to access said list for a predetermined number of tries prior to placing the first thread into the sleep state.

6. The data processing system according to claim 4, wherein awakening the first thread the first time comprises:
awakening the first thread the first time in response to a first to occur of: (1) determining at least one of said plurality of processing units has entered into an idle state, and (2) expiration of a predetermined period of time.

7. A computer-readable storage medium storing computer program code that, when executed by a computer system including a shared resource, causes the computer system to perform:
monitoring a plurality of threads which represent a plurality of tasks to be executed by at least one of a plurality of processing units;
implementing a transaction lock separate from the shared resource that synchronizes access by the plurality of threads to the shared resource, a list associated with the shared resource that orders at least one thread among the plurality of threads by priority of access to the shared resource, and a list lock that synchronizes access by the plurality of threads to the list;

in response to a first thread among said plurality of threads unsuccessfully attempting to acquire the transaction lock synchronizing access to the shared resource because the transaction lock is held by a second thread among said plurality of threads, the first thread attempting to acquire the list lock that synchronizes access to the list associated with said shared resource;

in response to said first thread failing to acquire the list lock because the list lock is held by a third thread among said plurality of threads, placing said first thread into a sleep state;

thereafter, awakening said first thread from said sleep state a first time and the first thread retrying said attempt to acquire said list lock;

in response to the first thread acquiring the list lock, placing the first thread into the sleep state and enrolling the thread in the list in order of priority of access to the shared resource; and in response to one or more of the plurality of processing units entering an idle state, awakening the first thread a second time in accordance with the order of priority of access to the shared resource specified by the list and executing the first thread to acquire the transaction lock and to access the shared resource.

8. The computer-readable medium according to claim 7, wherein said computer program code further causes the computer to perform:

in response to determining said list is locked by said third thread among said plurality of threads, retry said attempt to access said list for a predetermined number of tries prior to placing the first thread into the sleep state.

9. The computer-readable medium according to claim 7, wherein said awakening the first thread the first time comprises:

awakening the first thread the first time in response to a first to occur of: (1) determining at least one of said plurality of processing units has entered into an idle state, and (2) expiration of a predetermined period of time.

* * * * *